May 23, 1967   T. R. TURNER   3,321,157
DOUBLE HINGED FLAP
Filed Aug. 31, 1964

INVENTOR
THOMAS R. TURNER

BY

ATTORNEYS

United States Patent Office 3,321,157
Patented May 23, 1967

3,321,157
DOUBLE HINGED FLAP
Thomas R. Turner, Newport News, Va., assignor to the United States of America as represented by the Administrator of the National Aeronautics and Space Administration
Filed Aug. 31, 1964, Ser. No. 393,451
8 Claims. (Cl. 244—42)

The invention described herein may be manufactured and used by or for the Govrnment of the United States of America for governmental purposes without the payment of any royalties thereon or therefor.

This invention relates generally to an aircraft and more particularly to boundary layer control over a wing having multiple flap segments.

The operating cost of large aircraft and especially cargo transport aircraft is a function of the cruising lift-to-drag ratio which increases with aspect ratio. For higher aspect ratios, that is, where the span is large in order to obtain the necessary surface area, airflow separation occurs over the thick root section of the wing, which is required for structural reasons. Obviously, deep chord sections and thick root sections limit the lift-to-drag ratios obtainable for large winged aircraft. The lower lift-to-drag ratios inherent in deep airfoil sections not only are uneconomical, but require considerable runway length for takeoff and landing of the aircraft. It has been found that a blowing slot suitably located on the upper surface of the airfoil controls flow separation and the drag may be reduced by more than the power required to operate the blowing slot. It is also well known that provision of flaps having considerable surface area increases the lift to enhance takeoff and landing characteristics of the aircraft. However, the prior art flap construction is disadvantageous for a blowing-flap installation because of the large break in the wing upper surface.

The present invention, a flap comprised of two segments individually pivoted to the wing and having a narrow slot between the upper segment and the wing, overcomes the difficulties inherent in the prior art. Release of a high-pressure fluid from the slot controls the boundary layer and flow separation over the aft portion of the wing surface. Blowing high pressure air from the slot with the flap undeflected reduces separation over the aft portion of the airfoil resulting in a higher lift-to-drag ratio for more economical cruising. Blowing air from the same slot with the flap partially or fully deflected increases the lift for takeoff and landing.

It is an object of this invention to provide boundary layer control over a two-segment, double-hinged flap.

Yet another object of the instant invention is to provide boundary layer control over an airfoil having a thick root and large chord and a two-segment flap to increase the lift-to-drag ratio thereof and to increase the lift for takeoff and landing.

A further object of this invention is to provide increased cruising lift-to-drag ratio and enhance the lift characteristic during takeoff and landing of relatively thick wings by blowing a high-pressure fluid over the upper surface of a multiple segment flap.

Still another object of this invention is to provide a technique for increasing the lift-to-drag ratio of an aerodynamic body for economical cruising flight and enhancing landing and takeoff characteristics.

Yet another object of the instant invention is to prevent airflow turbulence because of a large break in the wing upper surface and relative vibration between the multiple flap segments utilized for reducing that break.

Yet another object of this invention is to provide boundary layer control wherein the airfoil drag can be reduced by more than the power drag required to operate the blower and a blowing flap induces large lift gains.

Generally, the foregoing and other objects are accomplished by pivotally mounted upper and lower flap segments on the trailing edge portion of the airfoil. The two flap segments have mutually abutting surfaces that slide on one another and are maintained in contact by a spring or track and connector arrangement. The adjacent upper portions of the airfoil and flap are curved to provide a small slot therebetween. A nozzle is positioned in the slot between the leading portion of the upper flap segment and the wing and is connected to a high pressure chamber by means of a conduit, all of which are located within the airfoil section. The chamber is connected to a source of high-pressure fluid with controls therebetween to govern the amount of fluid entering the chamber. Flap position is controlled by a linkage mechanism driven by a conventional power supply operated from within the aircraft. The nozzle slot location and the deflection of the upper flap segment permit full utilization of the high-pressure fluid in obtaining the boundary layer control that provides the desired high lift characteristics.

A more complete appreciation of the invention and many of the attendant advantages thereof will be readily apparent as the same becomes better understood by references to the following detailed description when considered in connection with the accompanying drawings wherein.

Figure 1:
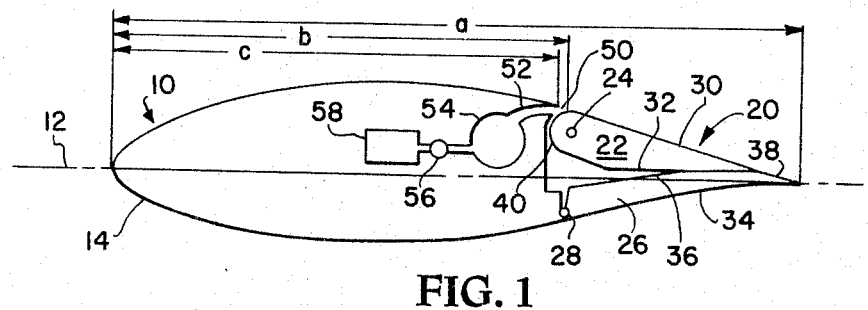
FIG. 1 is a diagrammatic cross section of an airfoil embodying the instant invention with parts omitted for clarity.

Referring now to the drawing wherein like reference numerals designate identical or corresponding parts throughout the several views and more particularly to FIG. 1 wherein an airfoil section generally designated by numeral 10, is shown as having centerline 12 corresponding to the centerline of the flow stream around the airfoil section. The airfoil section has leading edge 14 and a relatively deep chord. Dimension $a$ represents the length of the chord with dimension $b$ the distance from leading edge 14 to the leading edge of the flap. Dimension $c$ designates the distance from leading edge 14 to the after section of airfoil 10 adjacent the nozzle slot 50. Tests have shown that efficient operation of the invention results if dimension $b$ is equal to 0.654 of $a$ and dimension $c$ is equal to 0.65 of $a$.

Airfoil 10 is shown as having flap 20 adjacent the trailing edge. Flap 20 has upper flap segment 22 pivoted adjacent the upper edge surface of airfoil 10 on axis 24 and lower flap segment 26 pivoted at 28 to the lower portion of airfoil 10. Upper surface 30 of flap segment 22 conforms to the upper surface of the airfoil and terminates in a curved leading portion 40 that extends to lower surface 32. Flap segment 26 has lower surface 34 substantially forming an extension of the lower surface of airfoil section 10 and terminating at the trailing edge of flap 20. Surface portion 38 connects with upper surface 36 of flap segment 26 and forms an extension of upper surface 30 of flap segment 22 when flap 20 is in an undeflected position. As shown in FIG. 1, lower surface 32 of upper flap segment 22 substantially conforms for a portion thereof to upper surface 36 of lower flap 26.

Nozzle slot 50 forms the trailing edge of an elongated conduit 52 which connects to tubular chamber 54. The latter forming a container and equalizing area for the high-pressure fluid flowing into chamber 54 via a conduit from high-pressure fluid source 58; such for example as the compressor of a propulsion unit. Control mechanism or valve 56 is positioned between high-pressure fluid source 58 and chamber 54 to govern the amount of fluid released into the chamber. Chamber 54, nozzle 50 and conduit 52 extend substantially the span of flap 20.

Figure 2:
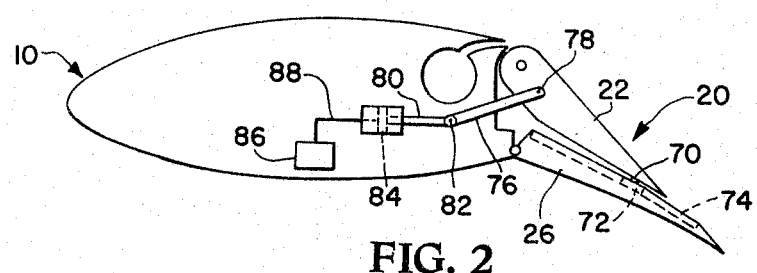
FIG. 2 is a diagrammatic cross section of an airfoil with parts omitted for clarity and showing the flap arrangement in a deflected position.
Figure 3:
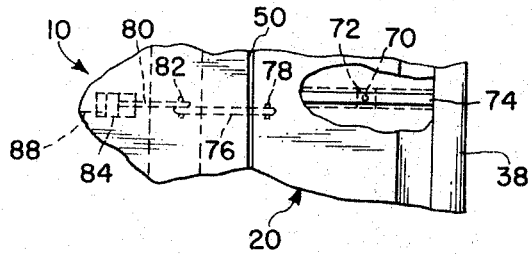
FIG. 3 is a diagrammatic plan view of a segment of the construction of FIG. 2.

FIGS. 2 and 3 show airfoil section 10 with flap 20 in a deflected position caused by a linkage mechanism. The linkage mechanism shown in FIGS. 2 and 3 has link 76 pivoted to upper flap segment 22 about pivot axis 78 and to piston rod 80 at pivot pin 82. Piston rod 80 operates in conjunction with a conventional double-acting cylinder 84 pressurized by a hydraulic fluid flowing through conduit 88 from control source 86.

In order to provide for coordination of movement and prevent relative vibration between the flap segments, upper flap segment 22 is provided with stud 70 with secured foot 72 in spaced relation thereto. Lower flap segment 26 is provided with a track which mates with foot 72. Although, as best seen in FIG. 3, foot 72 and track 74 are shown as having a dovetail cross section, it is readily apparent that other conventional sliding connections could be utilized. For example, track 74 could be of T-shape and countersunk within upper surface 36 of lower flap segment 26 with foot 72 being of flanged U-shape.

The operation of the linkage shown in FIGS. 2 and 3 causes deflection of upper flap segment 22 by forcing the hydraulic fluid under pressure through conduit 88 into cylinder 84 where it forces piston rod 80 rearwardly and causes link 76 to rotate counterclockwise; thus maintaining upper flap segment 22 in the normal cruising position as shown in FIG. 1. In order to cause flap 20 to deflect, pressure is relieved on one side of double-acting cylinder 84 which draws piston rod 80 forward and rotates link 76 clockwise. The coordination of movement of lower flap segment 26 is accomplished by foot 26 sliding in track 74.

Figure 4:
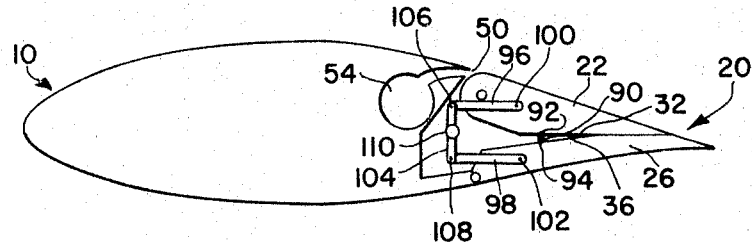
FIG. 4 is a diagrammatic cross section of an airfoil with parts omitted for clarity and showing an alternative drive mechanism.
Figure 5:
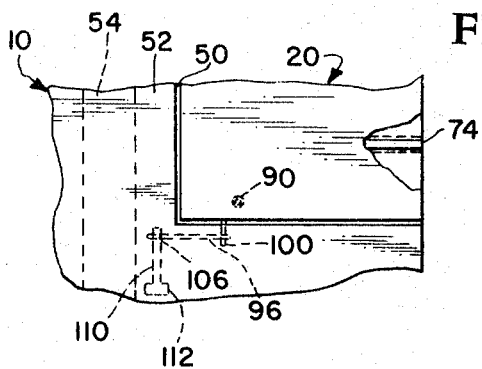
FIG. 5 is a diagrammatic plan view of the embodiment of the instant invention as shown in FIG. 4.

Another embodiment of a mechanism for operation of the two-segment flap of the instant invention is shown in FIGS. 4 and 5, wherein links 96 and 98 are respectively pivoted at one end at 100 and 102 to upper flap segment 22 and lower flap segment 26. The other ends of the pair of links 96 and 98 are pivoted respectively at 106 and 108 to the ends of bar extension 104 which is connected to drive shaft 110. A conventional activator or power source 112 is utilized for providing torque to shaft 110.

The mechanism of FIGS. 4 and 5 operates by a signal sent to activator 112 (FIG. 5) which rotates drive shaft 110 that in turn rotates bar extension 104. Links 96 and 98 reciprocate to cause movement of upper flap segment 22 and lower flap segment 26. Obviously, activator 112 must be capable of rotation either in a clockwise or counterclockwise direction. As shown in FIG. 4, clockwise rotation of shaft 110 causes a similar clockwise movement of bar extension 104 to thereby push link 96 toward the trailing edge of airfoil section 10 and pulls link 98 forward to effect deflection of both flap segments 22 and 26. Thus, it is seen that a counterclockwise rotation causes flap 20 and its individual flap segments 22 and 26 to be deflected into the high-lift landing and takeoff position while a clockwise rotation raises flap 20 to a cruising position. The exact location of links 96 and 98 and their corresponding pivots 100 and 102 would necessarily depend upon the size of flap 20 and its component segments 22 and 26.

In order to prevent relative vibration between the flap segments, spring 90 is mounted at 92 to upper flap segment 22 and 94 to lower flap segment 26. Obviously, many modifications for activation of the mechanisms as well as to prevent vibration between upper flap segment 22 and lower flap segment 26 may be utilized. For example, it may be desirable, in order to insure positive action of segments 22 and 26 as shown in FIGS. 4 and 5, to utilize the track and runner arrangement shown in FIGS. 2 and 3.

Thus it is seen that the multiple segment flap of the instant invention with pivotal axes located whereby curved portion 40 of upper flap segment 22 maintains a substantially narrow and uniform break in the upper surface of airfoil 10 to avoid any turbulence of airflow or drag created by the previously known wide breaks. In consequence of the small break, the blowing air or high-pressure fluid released through nozzle 50 is able to provide the utmost efficiency in operation of the system for boundary layer control when flap 20 is in a retracted position resulting in a higher lift-to-drag ratio for cruising. Full utilization of boundary layer control, regardless of the position of flap 20, has the attendant advantage of providing high lift characteristics for the airfoil during takeoff and landing.

Obviously, many modifications and variations of the subject invention are possible in the light of the above teachings.

It is, therefore, to be understood that within the scope of the appended claims, the invention may be practiced otherwise than as specifically described and shown.

What is claimed as new and desired to be secured by Letters Patent of the United States is:

1. In a boundary layer control system for an aircraft having wings with relatively large chords, the combination comprising: flap means extending substantially the length of the wing and having complementary upper and lower flap segments; said flap segments pivoted to said wing adjacent the upper and lower surfaces respectively at fixed points thereof; linkage means pivotally interconnected to said flap segments and actuator means; compressor means for a supply of high-pressure fluid; nozzle means between the upper surface of said wing and said upper flap segment; and conduit means extending between said compressor means and said nozzle means whereby high-pressure fluid from the compressor is exhausted over the upper flap segment to effectively control the boundary layer along the upper surface of the wing and thereby impart high-lift characteristics to the wing regardless of the orientation of the aircraft.

2. The boundary layer control system of claim 1 wherein the complementary flap segments have mutually abutting after portions; and slidable connecting means for preventing separation of said mutually abutting portions.

3. The boundary layer control system of claim 2 wherein said linkage means comprises a bar pivotally connected at one end to said upper flap segment and at the other end to said actuator means.

4. The boundary layer control system of claim 2 wherein the linkage means comprises a pair of links pivotally attached at one end to said upper and lower flap segments and at the other end to a bar extension secured to a drive shaft; and drive means for supplying power to said drive shaft.

5. The boundary layer control system of claim 2 wherein the connecting means include a track on said lower flap segment and a mating projection on said upper flap segment whereby said flap segments slidably engage one another.

6. The boundary layer control system of claim 2 wherein said connecting means comprise a spring.

7. The boundary layer control system of claim 2 wherein said linkage means comprises a bar pivotally connected at one end to said upper flap segment and at the other end to said actuators means; and said connecting means include a track on said lower flap segment and a mating projection on said upper flap segment whereby said flap segments slidably engage one another.

8. The boundary layer control system of claim 2 wherein the linkage means comprises a pair of links pivotally attached at one end to said upper and lower flap segments and at the other end to a bar extension secured to a drive shaft connected to drive means for supplying power thereto; and said connecting means comprise a spring.

References Cited by the Examiner
UNITED STATES PATENTS

| | | | |
|---|---|---|---|
| 2,142,123 | 1/1939 | Fahrney | 244—42 |
| 2,279,615 | 4/1942 | Bugatti | 244—42 |
| 3,127,129 | 3/1964 | Petrie | 244—42 |
| 3,188,021 | 6/1965 | Young | 244—42 |

FOREIGN PATENTS

| | | |
|---|---|---|
| 1,287,819 | 2/1962 | France. |

References Cited by the Applicant
UNITED STATES PATENTS

| | | |
|---|---|---|
| Re. 24,917 | 12/1960 | Attinello. |
| 1,848,809 | 3/1932 | Upson. |
| 2,137,882 | 11/1938 | Blaylock et al. |
| 2,406,919 | 9/1946 | Stalker. |
| 2,928,627 | 3/1960 | Johnson. |
| 2,940,690 | 6/1960 | Wood. |
| 2,978,207 | 4/1961 | Davidson. |

MILTON BUCHLER, *Primary Examiner.*

B. BELKIN, *Assistant Examiner.*